(No Model.)  7 Sheets—Sheet 1.

C. B. ADAMS.
TOBACCO PRESS.

No. 324,631.  Patented Aug. 18, 1885.

Witnesses
Chas. J. Williamson
Henry C. Hazard

Inventor
Charles B. Adams
by Prindle and Russell
Attorneys (No Model.)

7 Sheets—Sheet 2.

C. B. ADAMS.
TOBACCO PRESS.

No. 324,631.

Patented Aug. 18, 1885.

Witnesses
C. J. Williamson.
Henry C. Hazard

Inventor
Charles B. Adams
by Prindle and Russell (No Model.)

7 Sheets—Sheet 3.

C. B. ADAMS.
TOBACCO PRESS.

No. 324,631.  Patented Aug. 18, 1885.

(No Model.) 7 Sheets—Sheet 4.

C. B. ADAMS.
TOBACCO PRESS.

No. 324,631. Patented Aug. 18, 1885.

Witnesses
C. J. Williamson.
Henry C. Hazard.

Inventor
Charles B. Adams
by Prindle and Russell
Attorney (No Model.)

7 Sheets—Sheet 5.

C. B. ADAMS.
TOBACCO PRESS.

No. 324,631. Patented Aug. 18, 1885.

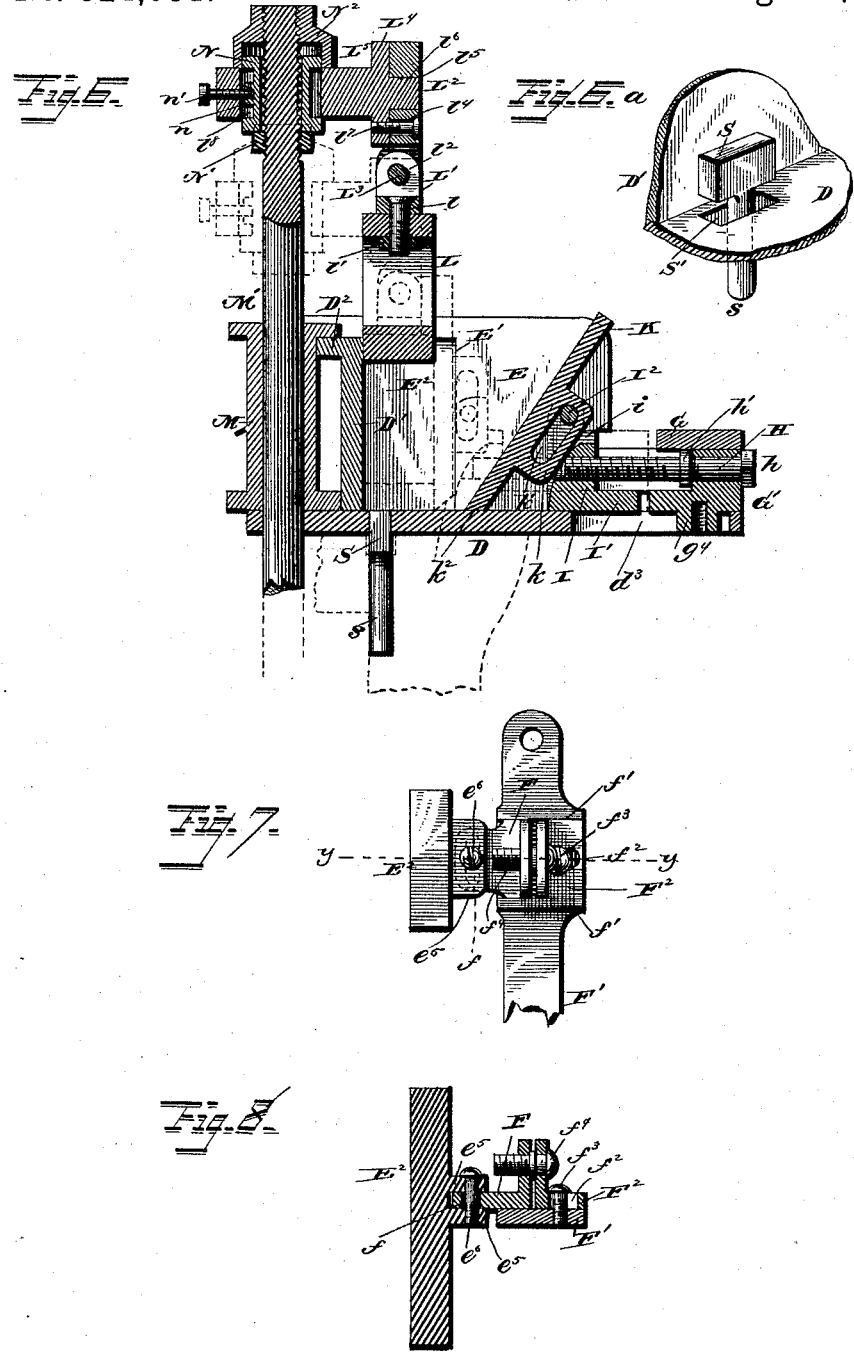

(No Model.) 7 Sheets—Sheet 7.
C. B. ADAMS.
TOBACCO PRESS.
No. 324,631. Patented Aug. 18, 1885.
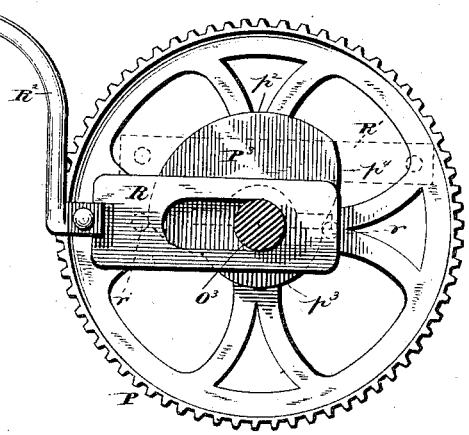
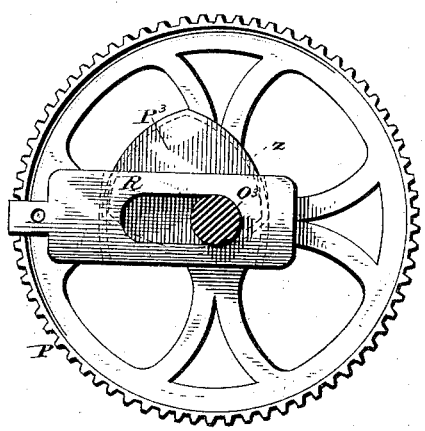
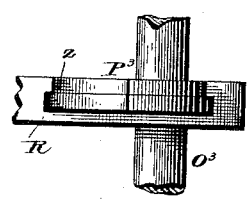
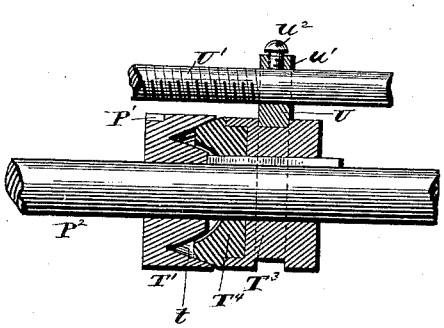
Witnesses
C. J. Williamson
Henry C. Hazard
Inventor
Charles B. Adams
by Prindle and Russell
Attorneys

UNITED STATES PATENT OFFICE.

CHARLES B. ADAMS, OF QUINCY, ILLINOIS.

TOBACCO-PRESS.

SPECIFICATION forming part of Letters Patent No. 324,631, dated August 18, 1885.

Application filed May 8, 1885. (No model.)

*To all whom it may concern:*

Be it known that I, CHARLES B. ADAMS, of Quincy, in the county of Adams, and in the State of Illinois, have invented certain new and useful Improvements in Tobacco-Presses; and I do hereby declare that the following is a full, clear, and exact description thereof, reference being had to the accompanying drawings, in which—

Figure 1:
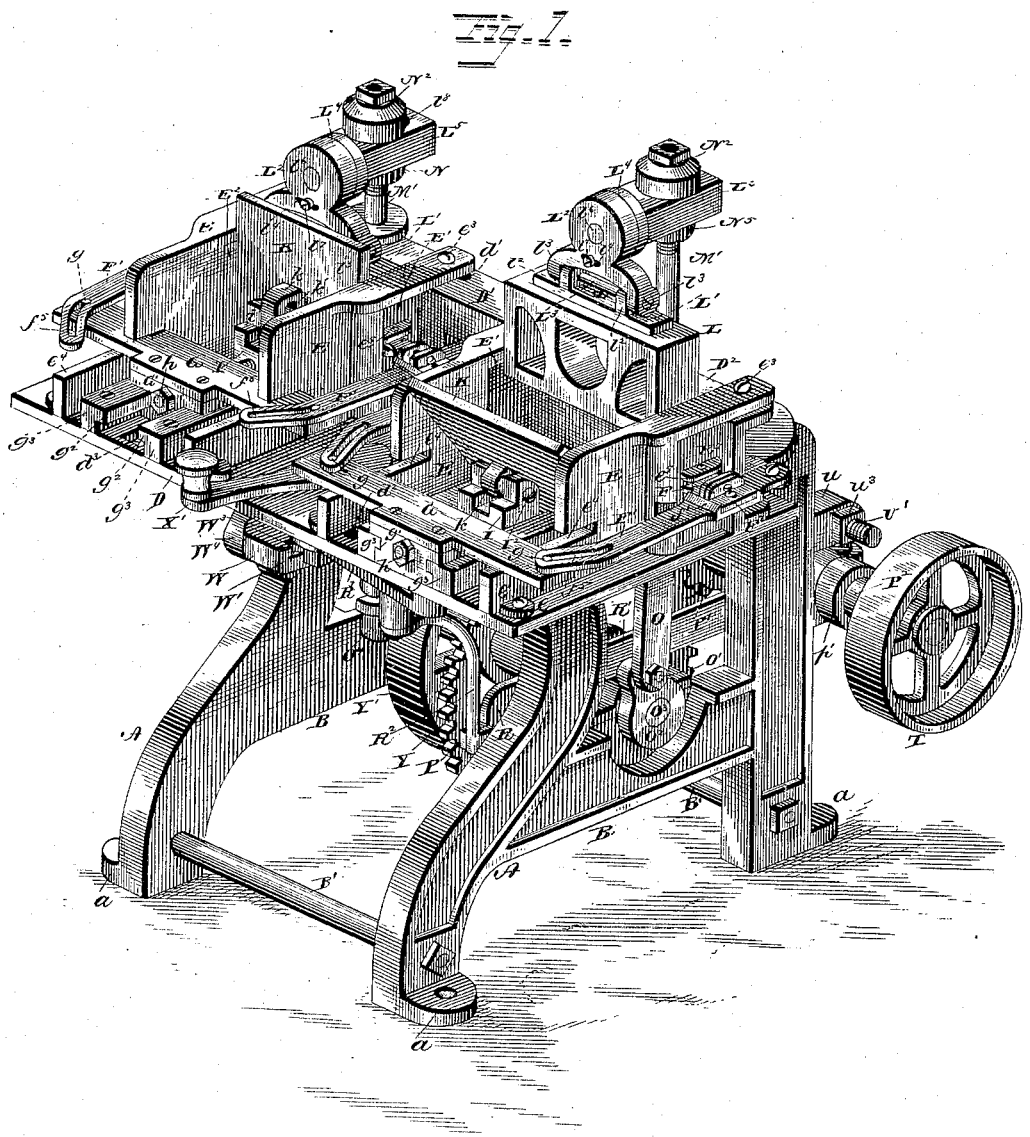
Figure 2:
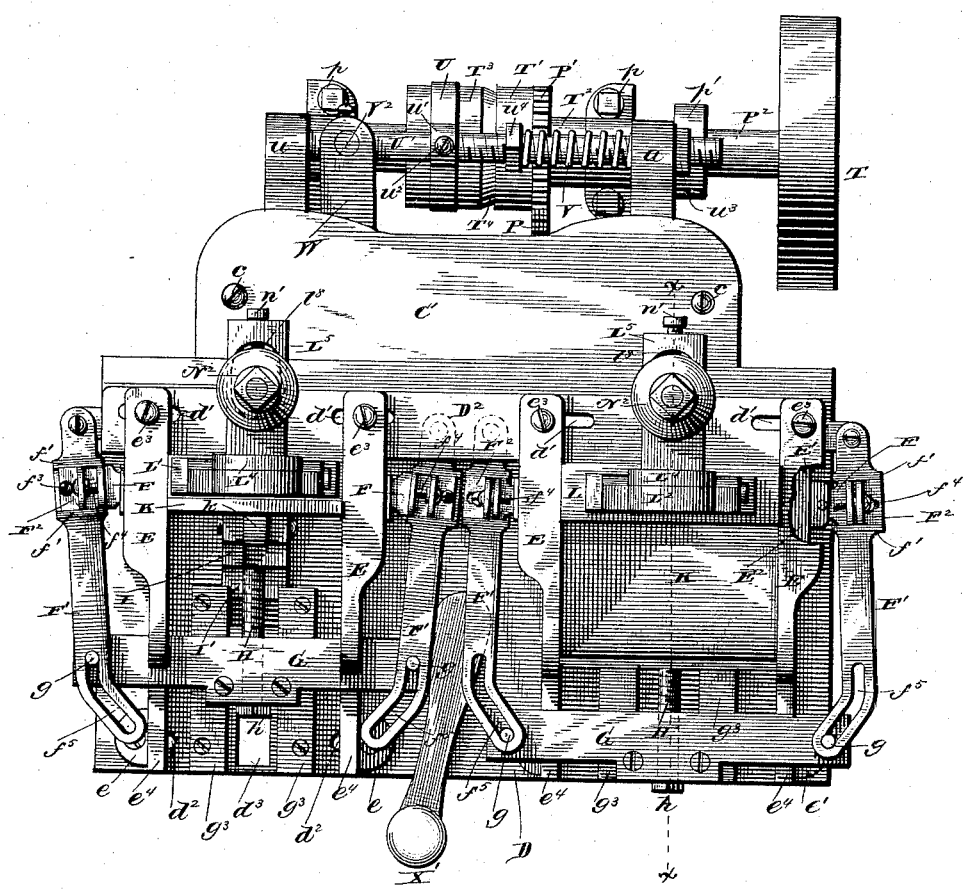
Figure 3:
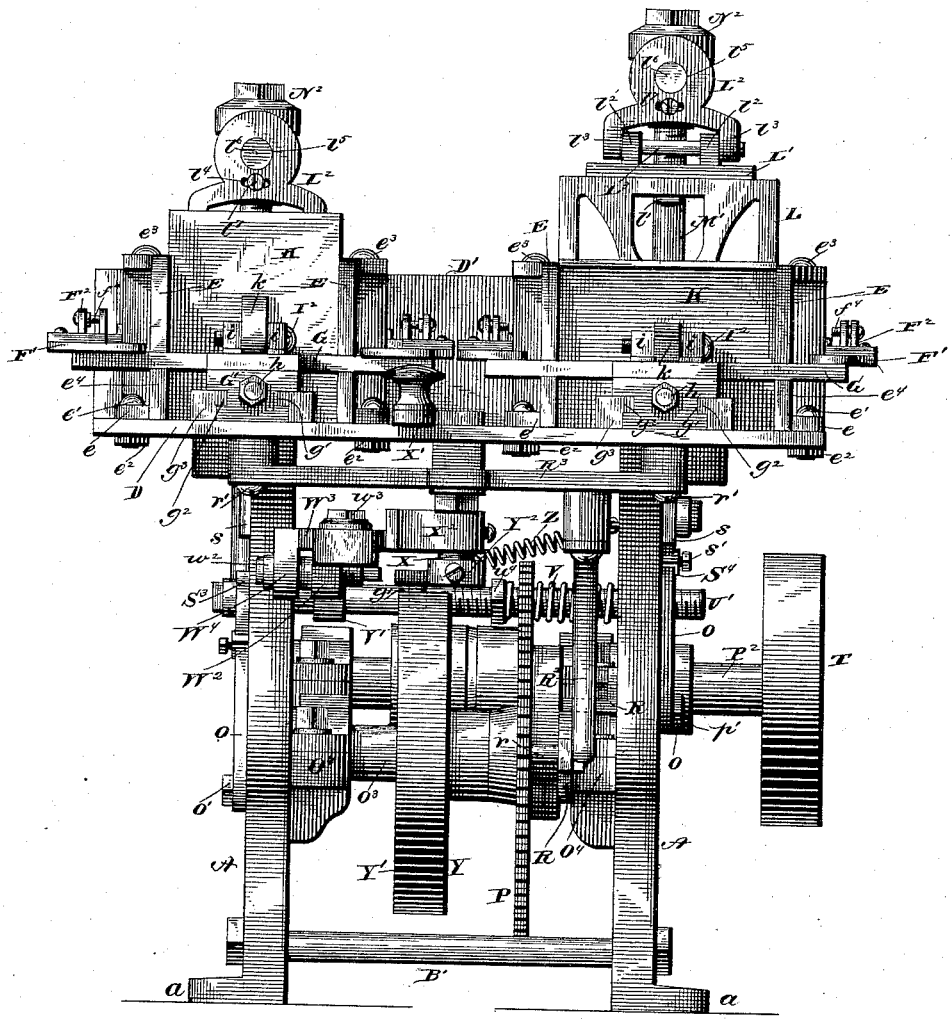
Figure 4:
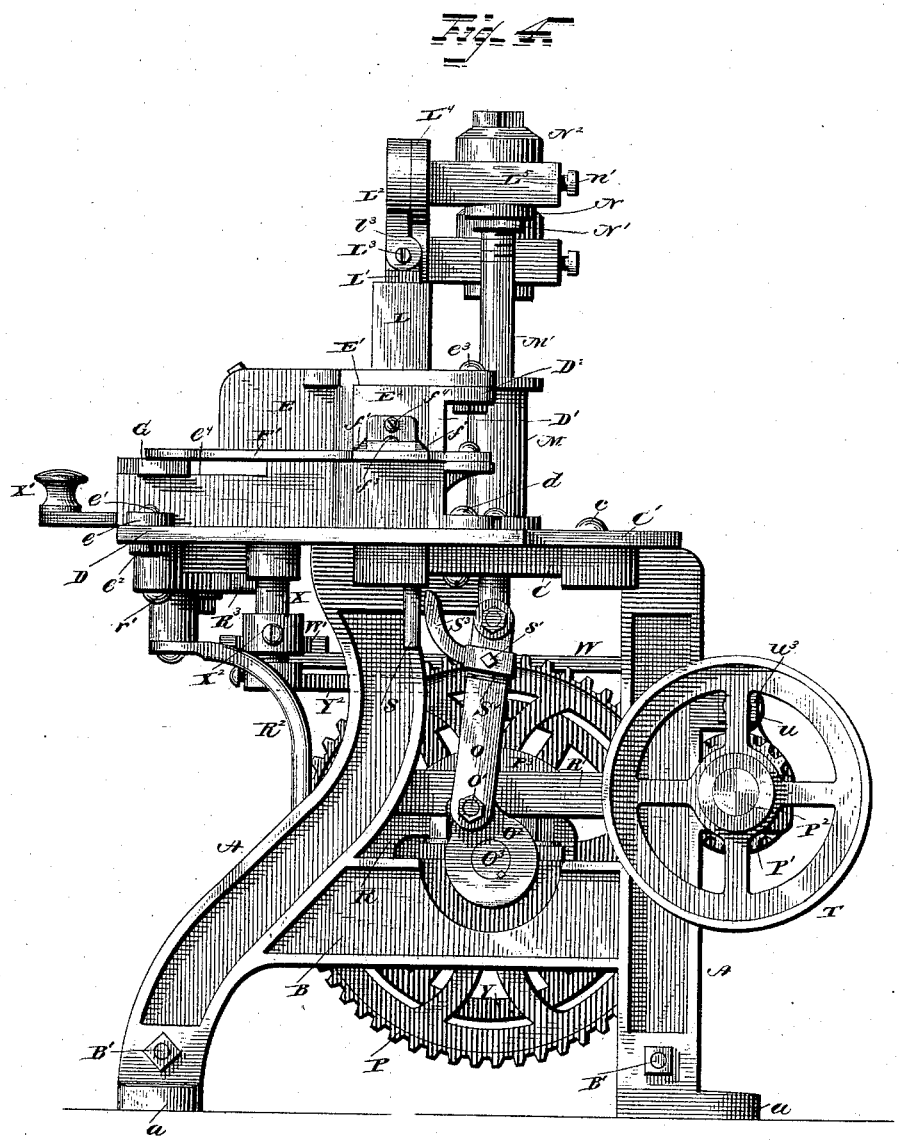
Figure 5:
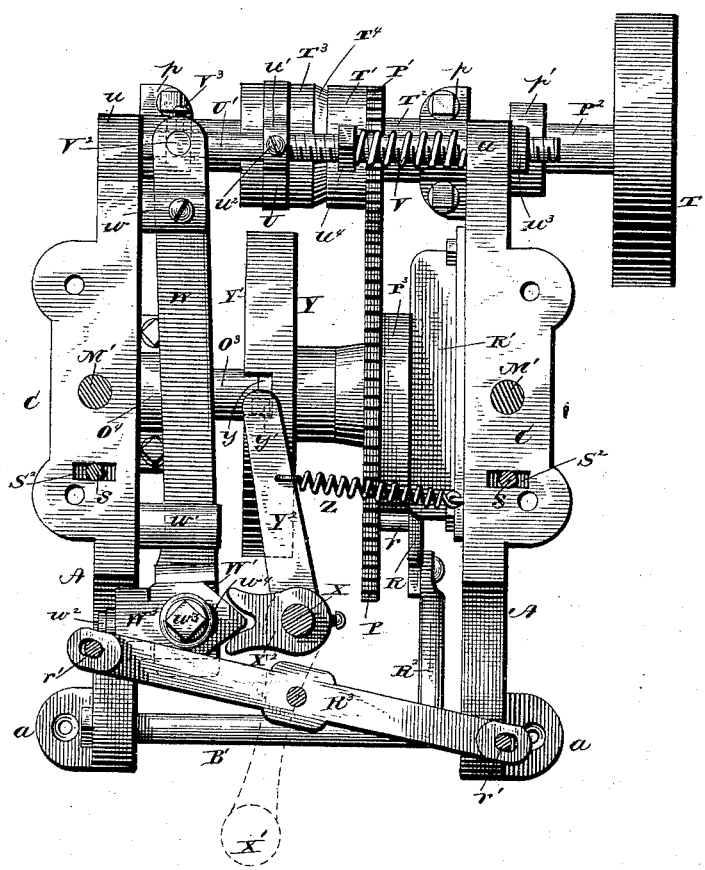
Figure 13:
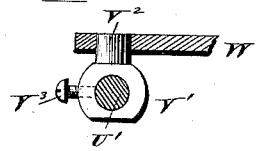

Figure 1 shows a perspective view of my machine; Fig. 2, a plan view of the same; Fig. 3, a view in elevation of said machine; Fig. 4, a side elevation of the same; Fig. 5, a plan view of the machine with the table and parts supported thereon removed; Fig. 6, a detail sectional view of the table and mechanism on and above the same on line $x\ x$ of Fig. 2; Fig. $6^a$, a detail perspective view showing the plug-loosener; Fig. 7, a detail plan view showing the connection of one of the mold side blocks with its lever; Fig. 8, a vertical sectional view on line $y\ y$ of Fig. 7; Fig. 9, a detail view in side elevation of the main gear-wheel, the attached cam, and the slide operated thereby; Fig. 10, a similar view of a modification thereof; Fig. 11, a detail sectional view of the clutch, clutch-fork, and shifting-rod; Fig. 12, a detail plan view of the wheel, cam, and slide shown in Fig. 9, and Fig. 13 a detail view of the adjustable connection between the clutch, shifting-lever, and the shifting-rod.

Letters of like name and kind refer to like parts in each of the figures.

The object of my invention is to provide an improved machine for pressing tobacco in plugs; and to this end it consists in the construction, arrangement, and combination of parts, as hereinafter specified.

The supporting-frame of my machine consists, as shown in the drawings, of two similarly-shaped parallel sides connected by bolt rods or bars. Each side is formed of the two uprights A A, connected together below their middle points by the bar or beam B, and at their lower ends provided with the usual feet or lugs, $a\ a$, by which they can be fastened to a floor. The two forward uprights and the two rear ones of the opposite sides are connected together near their lower ends by transverse bolt rods or bars B' B'. The upper ends of the standards of each pair are connected together by a horizontal piece, C, which, as shown, extends out beyond the sides of the standards.

The two uprights and the bar or beam B and the top piece C, forming each side of the frame, are preferably cast in one piece, but can of course be made separate and fastened together in any desired way. A plate, C', extends across the top of the rear portion of the frame and is fastened at each end to one of the top pieces C C by means of a bolt or screw, $c$. The table D extends across the top of the frame and is fastened thereto by means of the screws or bolts $d\ d$, passing up through the top pieces, C C, into the table. Upon this table is fastened the upright transverse plate D', extending across its rear side. This plate has at its top the rearwardly-extending horizontal flange $D^2$, provided with the longitudinal slots $d'\ d'\ d'\ d'$, for the purpose to be hereinafter set forth.

The plate D' forms the back of the two molds which I use in my machine. The bottoms of these molds are formed by the table D itself. Upon the table are the two pairs of upright parallel plates E E, forming ways for the reciprocating fronts of the molds, to be hereinafter described. The plates of each pair are near their forward ends provided with lugs or flanges $e\ e$, through which pass bolts $e'\ e'$, extending down through slots $d^2\ d^2$ in the table and provided on their lower ends with nuts $e^2\ e^2$. Portions of the rear ends of the plates extend over the top of the plate D', forming the mold-back, and are provided with bolts $e^3\ e^3$, extending down through the slots $d'\ d'$ in the flange $D^2$ of such plate, and provided on their lower ends with nuts.

With the construction and arrangement of parts just described the plates E E of each pair can obviously be adjusted toward or from each other to adjust the size of the space between them and fixed in any desired adjustment. The plates at their forward ends are cut down so as to leave the low portions $e^4\ e^4$ with horizontal upper faces. The rear ends of the plates just in front of the plate D' are cut away to form the rectangular openings E' E', extending nearly to the tops of the plates. In these openings fit and slide the blocks E² E², forming the moving sides of the molds. The outer side of each of these blocks is provided with two horizontal lugs or ears, $e^5$ $e^5$, down through which passes the bolt or screw $e^6$. Fitting between these lugs and provided with a slot, $f$, through which the screw $e^6$ passes, is the plate F, at its outer end turned up at a right angle. This plate at its sides fits between the parallel ribs $f'$ $f'$ on the upper side of lever F'. The way between these ribs is at right angles to the lever. Also fitting between the ribs is the plate F², slotted at $f^2$ longitudinally of the way on the lever. A screw, $f^3$, passing down through slot $f^2$ and into the lever, serves to fix the plate F² at any point of adjustment along in the way between the ribs on the lever, as will be clearly understood from Figs. 7 and 8 of the drawings. The inner end of the plate F² is turned up at a right angle, like plate F. A screw, $f^4$, is swiveled in the upright portion of plate F² and tapped through the like portion of plate F.

When the plate F² has been fastened to the lever by screw $f^3$, the plate F can then be adjusted longitudinally with reference to it by turning the screw $f^4$. By this adjustment of the plate F the position of the block E² is adjusted with reference to the lever.

The rear end of each of the block-moving levers is pivoted to lug on the plate D', forming, as described, the back of the molds. This plate between the molds is slotted to admit of the passage of the rear ends of the two levers operating the blocks on the inner sides of the two molds. The levers of each pair extend forward along the sides of the mold, and at front ends are turned or inclined inward toward each other. Near and at such front ends the levers are slotted longitudinally, each slot $f^5$ substantially following the shape of the lever—that is, having the portion substantially parallel to the central line of the main part of the lever and the portion at an angle to the other extending along the inturned end of the lever.

In the slots in each pair of levers play the pins $g$ $g$ on a bar, G, extending across the space between the side plates, E E, and over the reduced forward portions, $e^4$ $e^4$, of such plate. Each of the bars G G is at its middle attached to and carried by a slide-block, G', provided with grooves $g'$ $g'$ in its sides, receiving flanges or ribs $g^2$ $g^2$ on the inner sides of parallel guide blocks or bars $g^3$ $g^3$, fastened upon the table D midway between the plates E E. On the under side of each slide-block G' is a lug or projection, $g^4$, extending down into slot $d^3$ in the table D. In each block is journaled the outer cylindrical end or shank of a screw, H, having the head $h$ on the outer side of the block, and the collar $h'$ bearing against the inner side thereof, as shown best in Fig. 6. With this construction the screw can be rotated in the block, as desired, but is kept from longitudinal movement through the same. The other end of each of these screws is tapped into a block, I, provided with a base-plate, I', the projecting sides of which fit and slide between the guide-bars $g^3$ $g^3$ and under the flanges or ribs $g^2$ $g^2$ on such bars. By these bars and flanges the plate I' is not only guided in a straight line in its reciprocations, but is held down squarely upon the top of the table-plate D. By turning the screw H the block I can be adjusted to or from the slide-block G', for a purpose to be hereinafter set forth. The upper portion of block I is formed into or provided with the ears or lugs $i$ $i$, through which passes the pivot-pin I². Between these lugs plays the slotted lug $k$ on the plate K. The pivot-pin I² passes through the slot $k'$ in this lug. The upper ends of the lugs $i$ $i$ are rounded on the sides toward the plate K. This plate, which forms the moving front of the mold, is of a width sufficient to extend across and fill the space between the side plates, E E, and is somewhat higher than such plates. The lug $k$ on the outer side of the plate is so situated, and the slot $k'$ therein is of such length that as the plate stands vertical with its lower edge resting on the table-plate D, forming the bottom of the mold, the pivot-pin or screw I² will be at or near the lower end of the slot. The lower edge of the plate is beveled on its outer or forward side, as shown at $k^2$, so that if the plate be swung or inclined toward the front of the machine, the inner or rear edge of the plate will still rest squarely upon the plate D. With the slotted pivotal connection between the block I and plate K, as the block is drawn outward and forward by a corresponding movement of the block G connected therewith, as described, the plate with its lower edge remaining on the plate D will fall toward the front of the machine, the pivot-pin I' meanwhile traveling along the slot $k'$ until it reaches the upper end thereof, as shown best in Fig. 6. Further movement of the block I will then draw the plate K in its inclined position out toward the front of the machine.

As described hereinbefore, the bottom, sides, front, and back of each mold are formed, respectively, by the table-plate, the moving blocks E² E², the moving plate K, and the stationary plate D' on the table. The plunger for each of these molds consists of the vertically-reciprocating block L, having attached to its top, by means of a central bolt, $l$, and nut $l'$, a plate or bar, L', provided with the two pivot lugs or ears $l^2$ $l^2$. Through these lugs and the arms $l^3$ $l^3$ on the yoke L² passes the pivot-rod L³. The upper portion of the yoke is disk-shaped, as shown, and is provided with a short concentric slot, $l^4$, below its center. In the central opening, $l^5$, in this disk portion fits the cylindrical stud $l^6$ on the vertical disk L⁴, forming the forward end of the block L⁵. A screw, $l^7$, passes through the slot $l^4$ in the yoke and into the disk L⁴, its head engaging the outer face of the yoke. By this means the yoke can be adjusted, as desired, upon the stud $l^6$ as a center. The rear end of block L⁵ is slotted longitudinally at l⁸. Cylindrical hollow guide posts or blocks M M are fixed upon the table D in the rear of the plate D'. Each of these guide-blocks is centrally to the rear of one of the molds. Within them are guided the vertically-reciprocating rods M' M', passing down through suitable openings in the table and the top face of the frame, and at their lower ends connected with actuating mechanism, as hereinafter described. At its upper end each of these rods is screw-threaded, and passes up through a spool, N, the main portion of which is inclosed within the slot l⁸ in the rear end of one of the blocks L⁵ L⁵, and the flanges of which bear, respectively, against the upper and lower sides of the block. The spool is on its rear side provided with a stud, n, in which is swiveled the end of a screw, n', tapped through the rear end of block L⁵. On the rod below the spool is the screw-nut N', supporting the spool, and which can, as desired, obviously be screwed up or down to raise or lower the spool on the rod. On the rod above the spool is screwed the inverted cup-shaped nut N², whose lower edge engages the upper side of the block L⁵ beyond and around the upper flange of the spool. As this nut then is screwed down, the block L⁵ is clamped firmly between it and the lower flange of the spool, which, as described, is supported upon nut N' on the rod. When the nut N² is unscrewed, the block L⁵ can be adjusted more to the front or rear on the spool by screwing the screw n' in or out. When the block has thus been adjusted to bring the plunger carried by or connected with it, as described, into proper position over the mold, it is fastened in such adjustment by screwing down the nut N² again.

The construction described and shown allows and provides for the adjustment of the block, and consequently the plunger carried thereby forward or back and up or down with reference to the mold and its bottom. While the rods M' M' have always the same amount of motion the plungers can be adjusted to approach nearer to or be farther from the bottoms of the molds at the end of the downward stroke of the rods. The amount of compression of the tobacco within the molds can thus be nicely adjusted or regulated, as desired. The lower ends of the rods M' M' are pivotally connected with the pitman-rods O O, which in turn are at their lower ends pivoted upon crank-pins O' O' on cranks O² O² on the opposite ends of the shaft O³ extending across the frame, and journaled in suitable bearings or journal-boxes, O⁴ O⁴, on the opposite frame-beams B B. These cranks are arranged on the shaft so as to project therefrom in directions diametrically opposite. As the shaft revolves, then the rods M' M' will move alternately in opposite directions, one being raised while the other is being drawn down. One plunger will then be descending to press the plug in one of the molds, while the other is rising to allow the pressed plug to be removed from the other mold, and a new charge of tobacco to be placed in the latter. On the shaft near the journal-bearing for its right-hand end is a gear-wheel, P, which meshes with and is driven by a small gear-wheel or pinion, P', on shaft P², journaled in bearings or boxes p p, attached to the rear uprights of the frame. The shaft is held from longitudinal movement in its bearing by means of the ordinary collars, p' p', in common use for such purpose.

Attached to the outer side of gear-wheel P is the cam P³, surrounding the shaft O³. This cam consists of the two diametrically-opposite concentric portions p² and p³, the portion p² having a greater radius than the other. The arc of curvature of the outer edge of each of these portions is three-eighths of a circle. Each of the remaining portions, p⁴ p⁴, of the cam connecting the extremities of the concentric portions referred to above is curved on an arc whose radius is equal to the distance between the contiguous ends of the two concentric portions. With this construction, a line drawn through the center from which the concentric curves of the cam are described to the opposite sides of the cam, will always be of the same length, in whichever direction it be drawn. The cam is so placed on the wheel P that the center of curvature of its concentric portions will coincide with the axis of shaft O³. Upon this shaft, between the cam and the journal-bearing of the shaft, is the slotted yoke-plate R, provided with pins or studs r r, engaging the cam at points diametrically opposite each other, the distance between the pins being substantially equal to the diameter of the cam, or the distance from one edge or side of the cam to the other measured on a line passing through the main center of curvature of the cam. The yoke is guided in its reciprocations between the cam and the bearing of the shaft, and by the plate R', attached to the inner side of the frame-upright and engaging the upper straight edge or top of the yoke-plate. With this construction the yoke, by the action of the cam on the pins or studs r r, will be reciprocated in a straight line at right angles to the shaft.

To the forward end of the yoke-plate is attached a rigid arm, R², which is curved upward, and at its upper and forward end is pivotally connected to one arm of the horizontally-swinging lever R³, extending across under the table D, and pivoted thereto near its front edge. The opposite ends of this lever are pivotally connected with the lugs or projections g⁴ g⁴ on the bottoms of the slide-blocks G' G', by screws r' r' passing up through longitudinal slots in the lever ends into such lugs.

The cam P³ and the crank O² on that end of the shaft O³ are so arranged relatively that as the crank passes its upper dead-center and begins to descend, one of the eccentrically-curved portions begins to act upon the rear pin on the yoke. By one-eighth of a turn of the shaft and cam the length of this eccentric portion will be caused to ride over the pin, thus causing it and the sliding yoke to travel to the limit of its rearward throw. By the engagement of the concentric portions of the cam with both pins or studs the yoke will then be held stationary until the shaft has revolved through three-eighths of a revolution—that is, until the crank has reached and is passing its lower dead-center. The eccentric portion of the cam which has, as described before, engaged the rear pin or stud on the yoke, now engages the forward pin thereon and forces the yoke forward during the next eighth of a revolution of the shaft. The slide is then held stationary again during the remaining three-eighths of a revolution of the shaft and crank. As the crank actuates the plunger of the mold above, and an arm of the lever $R^3$ is pivotally connected with the rod $R^2$, extending from the yoke, such lever-arm will be pulled rearward to the extent of its motion during the first portion of the descent of the plunger, will be held stationary during the rest of the descent thereof, then moved quickly forward during the first portion of the rise of the plunger, and then held stationary again while the plunger continues to rise. As the other plunger is operated by the diametrically-opposite crank on the shaft, the opposite end or arm of the lever $R^3$ will obviously move in the same way with reference to such other plunger as the lever-arm above referred to is described as doing with reference to its respective plunger.

As described hereinbefore, the slide-blocks G' G' are pivotally connected with the opposite ends of the lever $R^3$, so that they will be carried forward and back by the movement of their respective lever-arms. Each of the movable front plates, K K, for the two molds, connected, as described, with one of the blocks G' G', will be carried rearward to close the front of the mold during the first part of the descent of its respective plunger, will be held closing the mold until the beginning of the upward movement of the plunger, will then be quickly drawn forward from the mold, and then be held away during the continued rising of the plunger. As the bars G G are attached to and carried forward and back by the blocks G' G', the pins $g\,g$ on them, playing in the slots in the levers F' F', swing the levers to move the mold side blocks $E^2$ $E^2$, inward toward the center of the respective mold and outward again. As the outer ends of the slots in each pair of levers F' F' are inclined inward toward each other, both levers of a pair will be swung inward, so as to make the side blocks close the side of the mold during the first half of the movement of the bar G with the slide-block G' as the latter moves rearward to close the front of the mold. The sides of the mold are thus closed up before the front and before the plunger has descended enough to compress the tobacco at all. During the rest of the movement of the slide-block and the bar G' the levers and the side blocks, $E^2$ $E^2$, are held stationary by the pins $g\,g$ sliding along in the straight longitudinal portions of the slots in the levers. As the slide-block is moved back again to open the mold after the plunger has been partially raised to take the pressure off of the top of the lump in the mold, the side block levers remain stationary until after the mold-front has been drawn well back and the pins $g\,g$ have reached the inwardly-inclined portions of the slots in the levers again. The ends of the lump or plug are thus held compressed until after the pressure upon the top and front of the lump has been removed. Such action is very essential, as if the pressure upon the ends were removed or diminished before the pressure on the top and against the front and back of the lump were relieved, the lump would be spread out and made irregular with uneven and ragged edges. The lump or plug could not then be wrapped evenly and well, and more wrapper would necessarily be used. As this wrapper is very expensive, it is especially desirable to economize as much as possible in its use. Where, as in my machine, the lump or plug is held from endwise expansion until after the pressure upon the top of the plug and on its front has been moved, the lump is always regular and of the same width, and its edges are straight and well defined. To loosen the plug after it is formed, and raise it so that it can be easily taken out of the mold, a lifter or loosener, S, is provided for each mold, which fits in a hole, S', in the bottom of the mold, and has its upper face normally flush with such bottom. When it is down in its normal position, as described, the head of the lifter rests upon the bottom of the recess $S^2$ in the top piece C of the frame. The lifter-shank $s$ extends downward through such piece, so that its lower end is in position to be engaged by end of arm $S^3$ on the sleeve $S^4$ on the pitman-rod O as such rod is raised by the actuating-crank. This sleeve is adjustable on the rod, being provided with a set-screw, $s'$, engaging the side of the rod, so that the sleeve can be slid up or down and then fixed in position. The crank, as it revolves to raise the rod O', swings said rod forward so as to bring the upper end of the arm $S^3$ up under and into engagement with the lower end of the lifter-shank. The lifter is then raised and carried upward until the crank has revolved upward and then rearward, so as to swing the rod O to the rear of the machine far enough to disengage the end of arm $S^3$ from the lifter-shank. The lifter then drops back into its normal position again.

My invention, with its alternately-acting molds and plungers, can, if desired, be run continuously by power applied to shaft $P^2$; but I prefer to make its action intermittent, and therefore provide it with automatic means of throwing its mechanism out of action at each half-revolution of the crank-shaft $O^3$ as each crank reaches the lowest point of its travel and draws its corresponding plunger down to the end of its stroke. The other plunger will then be held in its raised position, the respective molds for the plungers being correspondingly closed and opened.

The pinion P' heretofore referred to is loosely journaled on the continuously-revolving shaft P², which is provided with pulley or wheel T, which can be driven from any desired source of power. This pinion is attached to or made in one piece with the loose sleeve T', journaled on the shaft. Against the outer face of the pinion is the fixed collar T² on the shaft, which prevents the movement outward of the pinion and attached sleeve T', which forms one half of a friction-clutch, its inner side being provided with an annular groove, $t$, in cross-section V-shaped. The other half, T³, of the clutch is keyed on the shaft so that it can slide on but revolves with the shaft, and on its side toward the other clutch-half is recessed to receive the annular wooden block T⁴ on its outer side, substantially the shape of a frustum of a cone in cross-section, so as to fit closely in the groove $t$ on the loose clutch-half T'.

Instead of wood, a block of rubber, leather, or semi-elastic material can be used.

Instead of making a V-shaped groove in the loose half of the clutch, the face of such half can be made plane or flat, the friction-block on the sliding clutch-half being correspondingly shaped. The clutch-half T³ is grooved circumferentially to receive the clutch-fork U at its upper end sleeved upon the rod U', supported and sliding at each end in lugs $u$ $u$ on opposite sides of the frame. The sleeve $u'$ of the fork is provided with a set-screw, $u^2$, by which it can be set at any desired position on the rod. The end of the rod toward the driving-wheel end of shaft P² is screw-threaded, as shown. Upon the extreme outer end of the shaft, beyond the lug $u$, is the nut $u^3$. Also, upon the rod near the clutch-fork sleeve is screwed another nut, $u^4$, between which and the lug $u$, just referred to, is placed around the shaft the spiral spring V. This spring bearing against the nut $u^4$, by the screwing up of which the stress of the spring can be adjusted, forces the rod along, so as to cause the clutch-fork to move the clutch-half T³ away from the other half, T', to disengage the frictional surfaces from each other, so that the half T' can remain stationary while the shaft revolves. The amount of such movement of the rod can be regulated by screwing the nut $u^3$ in on the rod. Upon such rod beyond the clutch-fork sleeve is another sleeve, V', having the upwardly-extending lug or shank V² and the set-screw V³, by means of which it can be adjustably fixed upon the rod. The shank V' is swiveled in the end of lever W, which is pivoted on a lug, $w$, on the side of the frame. The lever near its forward end is supported and guided in its movements between the arms of the horizontal forked stud $w'$, attached to the frame side, and at its forward end is formed with the transverse slideway W' on its upper side, and the lug W² on its under side. In this slideway fits the slotted plate W³, having the wedge or V shaped inner end extending beyond the inner side of the lever-arm, and the lug W⁴ on its other end extending down beyond and parallel to the lug W² on the lever. A screw, $w^2$, swiveled in lug W⁴ and tapped through lug W², serves to adjust the plate W³ longitudinally in the slideway on the lever. A screw, $w^3$, passing down through the slot $w^4$ in the plate W³ and into the lever, serves to fix the plate as adjusted. A short vertical shaft, X, journaled in the table-plate D, carries on its upper end the crank or lever arm X', extending forward beyond the edge of the table into convenient reach of the operator. Upon this shaft below the table is fixed the horizontal forked arm X², having its fork made V-shaped, as shown best in Fig. 4, to receive and engage the wedge-shaped end of the plate W³ on the clutch-lever. The sides of the V in the arm X² are preferably rounded slightly, as shown, so as to ride freely over the inclined sides of wedge end of the plate as the arm is swung by the rotation of shaft X. With this construction the wedge end of the plate on the lever is normally held in position between the sides of the fork in arm X² by the action of the spring on the clutch-shifting rod, as will be understood clearly upon reference to the drawings. If, now, the lever-arm X' be swung over to the right, the rear arm of the fork or V on the arm X² will engage the inclined rear side of the wedge-shaped end of the plate W³ and riding over such side will force the plate and lever outward. This movement of the lever through the connections described throws the clutch into operation to cause the pinion P' to rotate and drive the gear P and the mechanism of the machine.

In order to keep the clutch in operation until the shaft O³ has been revolved through one-half of a revolution, I provide on said shaft a wheel, Y, having on its side a flange, Y', provided with diametrically-opposite notches $y$ $y$. On the lower end of the shaft X below the forked arm X² is a second arm, Y², extending rearward and provided with a pin, $y'$, adapted to engage the edge of flange Y'. The notches $y$ $y$ are so situated that one of them is brought by the rotation of the wheel Y opposite the pin just as each crank on the shaft reaches the lowest or highest point of its travel. With this construction, when the lever-arm X' has been swung over to put the clutch in operation, as described above, the wheel Y rotates to bring the flange thereon in engagement with the pin $y'$. The arm Y², and consequently the fork-arm X², will then be kept in the positions to which they are carried by the swinging of arm X', as above, until the wheel Y has made one-half of a revolution and one of the notches $y$ $y$ is brought around to the pin. By the pressure of the wedge-plate on the lever against the fork-arm on the rocking shaft the arm Y² is kept pressed with its pin against the wheel-flange. As then the notch comes around opposite the pin, the latter drops into it, allowing the arm Y² to swing, so as to allow the fork-arm X² also to swing forward again until the apex of its notch comes opposite the point of the wedge on the lever. The end clutch-shifting lever can and does then fly inward, and the clutch is thrown out of action. It remains inactive until the clutch-lever is again swinging outward in the manner and by the means already described.

A modified form of cam and yoke on the gear-wheel P is shown in Figs. 10 and 12. In this form a cam in the shape of an equilateral spherical triangle is used, the center of motion of which is at or near one corner of the triangle. The cam is on the side toward the wheel P, rabbeted annularly at $z$. The yoke is formed with lugs having their cam-engaging faces shaped to correspond with the shape of the cam face or edge, so that the yoke will, while it is being reciprocated by the cam, be held close up to the side of the latter. By means of the set-screw $l^7$ the plunger-carrying yoke can be set at any desired angular adjustment on the stud $l^6$ on the disk end of the bar or block L. The angle of the lower face of the plunger with reference to the mold-bottom can by such adjustment of the yoke be adjusted, as desired, to bring such face exactly parallel with the mold-bottom. As the plungers are hinged to the supporting-yokes, they can, when the molds are open, be swung forward and up, so that their lower faces or edges can be cleaned when found necessary.

The operation of my machine is briefly as follows: One mold being closed, with its plunger down, and the other being open, with its plunger raised and its front plate retracted and inclined toward the front of the machine, a charge of tobacco of the required size is then introduced into the open mold, the inclined inner face of the mold front plate facilitating the insertion of the charge in the mold. The lever-handle X' is then thrown to the right, throwing the gearing and mechanism into action, as clearly indicated hereinbefore. The front plate of the mold is then moved toward said mold. During the first part of such movement of the plate, and before it closes the mold, the side blocks are moved inward to close the sides of the mold. As the motion of the front plate continues, its lower edge pressing against the tobacco is retarded and the plate is caused to swing into an upright position at right angles to the mold-bottom. When the plate closes the mold and presses the lump, it will then be parallel to the back or rear wall of the mold. These motions of the sides and front of the mold take place and are finished while the plunger is moving through the first portion of its descent, and before it has descended far enough to compress the tobacco in the mold. The sides and front of the mold are then held stationary while the plunger completes its descent. Meanwhile as the plunger just described begins to descend the other one begins to rise, and during the first part of its such rising motion the front plate of its mold is withdrawn. After the retraction of such plate to a certain distance the side blocks are moved outward. The retraction of the front plate and withdrawing of the side blocks are finished during the first part of the rising of the plunger; but the side blocks are not withdrawn until after the plunger has risen some distance and the front plate has been retracted, as described above. As the front plate is retracted, it falls back so as to be inclined upward and outward, as already herein described. As the plunger continues to rise, the lifter in the bottom of the mold is raised and then dropped again by the mechanism described. When the plunger first described has reached the lower end of its stroke, and the other has reached the upper end of its stroke, the machine is automatically thrown out of action by the clutch-shifting mechanism described. A charge of tobacco having been placed in the open mold the machinery is started again. The first-described plunger is raised and the front plate is withdrawn during the first part of its movement. After the plunger has been raised some distance and the front plate withdrawn to remove pressure from the plug, the side blocks are retracted. As the rising of the plunger continues, the lifter, actuated as described, loosens and raises the pressed plug so that it can readily be taken out at the front of the mold. Meantime the other plunger and parts of the other mold are acting in precisely the same way as the first plunger and mold were described as acting when the machine was first started. The keeping the side blocks in their inner positions against the ends or sides of the plug until pressure has been taken off the front and top of the plug by the withdrawal of the front plate and raising of the plunger I consider very advantageous and essential, for the reasons already set forth herein. To aid in keeping the arm Y² with its pin pressed toward and against the flange on wheel Y, and to cause it to swing quickly when a notch in the flange comes around to the pin $y'$ on the arm, I provide the spring Z, attached at one end to the arm and at the other to a portion of the frame.

Having thus described my invention, what I claim is—

1. In a tobacco-press, the two stationary molds placed side by side which are each adapted to be opened and closed, in combination with mechanism whereby when one of said molds is opened the other is simultaneously closed, substantially as and for the purpose described.

2. In a tobacco-press, the two stationary molds placed side by side and having their open ends facing the same way, in combination with the two sets of alternately-acting compressing mechanism for the molds, substantially as and for the purpose described.

3. In combination with the two stationary molds placed side by side on a suitable table or support and having their fronts turned the same way, the two sets of alternately-acting compressing mechanisms for the molds and the lever for starting the mechanisms into action situated between the two molds within reach of the one tending the molds from the front of the machine, substantially as and for the purpose described.

4. In combination with the two stationary molds placed side by side and adapted to be filled from the front of the machine, the two sets of alternately-acting compressing mechanisms for the molds and the lever for starting such mechanisms into operation placed within reach of the operator from the front of the machine, substantially as and for the purpose described.

5. In a tobacco-press, a mold having a stationary back and bottom and movable front and ends, in combination with power-driven means, substantially as described, for automatically closing the mold front and ends inward, substantially as and for the purpose shown.

6. In a tobacco-press, a mold having a stationary bottom and back and movable ends and front, in combination with power-driven mechanism, whereby the ends are closed inward before the movable front is caused to close the front of the mold, substantially as and for the purpose described.

7. In combination with the mold having the movable front and ends and a plunger, means, substantially as described, for actuating the plunger and the mold front and ends from the same source of power, substantially as and for the purpose described.

8. In combination with the plunger, the movable front and ends of the mold, the power-driven shaft, mechanism actuated from said shaft to move the plunger, and mechanism, substantially as described, also actuated from the shaft to move the mold front and ends, substantially as and for the purpose described.

9. In combination with the plunger and the movable mold front and ends, automatic means, substantially as described, actuated from the same source of power adapted to actuate the plunger and the mold front and ends so that the mold ends are closed before the front and the front is closed before the plunger reaches the end of its downward stroke, substantially as and for the purpose described.

10. In combination with the plunger and the movable mold front and ends, automatic means actuated from the same source of power adapted to actuate the plunger, the mold front, and the mold ends, so that the front of the mold is retracted some distance before the ends are moved outward and the ends are retracted, substantially as and for the purpose described.

11. In combination with the two molds, two sets of automatically-acting compressing mechanisms, connecting means for positively opening and closing them operated from the same source of power, automatic means for stopping such compressing mechanisms as each one completes its compressing action and the other is open to receive a new charge, and means, substantially as described, for throwing them into action again, as desired, substantially as and for the purpose described.

12. In combination with the movable ends of the mold, the two slotted levers connected with such ends and the moving bar provided with pins engaging the slots in the levers, substantially as and for the purpose described.

13. In combination with the movable block or plate forming an end of the mold, the lever adjustably connected with such block or plate, substantially as and for the purpose described.

14. In combination with the movable end block or plate provided with lugs on its outer side, the plate provided with a slot near one end and having its other end turned up, the pin passing through the lugs and the slot in the plate, the actuating-lever provided with a guideway receiving the outer end of the plate, a longitudinally-slotted plate in such guideway turned up at its inner end, a set-screw extending through the slot in this plate into the lever, and a screw connecting the turned-up portions of the two plates, substantially as and for the purpose described.

15. In combination with the lever provided with a transverse guideway, a plate fastened to the lever and having one end turned up, a second plate fitting in the guideway and having its end nearest the other plate turned up and its other end slotted transversely, the screw connecting the upturned portions of the two plates, the mold end block provided with lugs on its outer face, and the screw or pin passing through such lugs and the slot in the plate, substantially as and for the purpose described.

16. In combination with the two movable mold ends, the two levers outside of such ends, each provided with a slot having a portion substantially longitudinal and a portion inclined inward, suitable connections between the movable mold ends and the levers, and a moving bar having pins playing in the slots in the levers, substantially as and for the purpose described.

17. In combination with the movable front plate of the mold, the sliding block, connections between the block and plate whereby the plate is moved with the block, a bar on the block, the pins on the bar, the movable ends of the mold, the levers connected by suitable connections with the outer sides of such ends, and provided with slots at their inner ends, substantially longitudinal to the levers, and at their outer ends inclined, substantially as and for the purpose described.

18. In a tobacco-press, in combination with a reciprocating block driven in any desired manner, a sliding plate or block, a screw swiveled in a portion of one of the blocks and tapped into a portion of the other, and the plate for closing the front of the mold connected with and carried by the inner block, substantially as set forth and described.

19. In combination with the reciprocating block driven in any desired manner, the sliding plate or block connected with and driven from the other block, the lugs on the plate or block, the front plate of the mold having a slotted lug extending between the lugs on the block, and the pin or screw passing through the lugs on the block and the slot in the lug on the plate, substantially as and for the purpose described.

20. In combination with the plate for closing the front of the mold having on its outer side a slotted lug, the sliding plate or block provided with lugs embracing the lug on the plate, and a pin passing through the lugs on the block and the slot in the one on the front plate, substantially as and for the purpose described.

21. In a tobacco-press, in combination with the rest of the mold, the movable front plate having its lower side beveled, substantially as shown and described, the slotted lug on the outer side of the plate, the sliding plate or block for actuating the front plate, the upright lugs thereon embracing the slotted lug on the front plate, and a pin passing through the lugs on the sliding block or plate and the slot in the lug on the mold front plate, substantially as and for the purpose described.

22. In a press, in combination with the two plungers, the plunger-moving rods, the rotary shaft, the two diametrically-opposite cranks thereon, the rods connecting such cranks with the respective plunger-moving rods, mechanism for driving the shaft, and means for automatically stopping the shaft as the cranks reach their dead-centers with respect to the connecting-rod, substantially as and for the purpose described.

23. In combination with the rotating shaft, means whereby it is driven from any desired source of power, the diametrically-opposite cranks on the shaft, the plunger-actuating rods connected with and driven by the cranks, means for automatically throwing the connections between the shaft and the power out of action as each crank reaches the point of its greatest throw with reference to its respective plunger-rod, and means for throwing such connections into action again at will, substantially as and for the purpose described.

24. In combination with the reciprocating rod, the nut screwed thereon, the spool-shaped sleeve on the rod above the nut, the slotted bar or arm receiving the reduced main portion of such sleeve in its slot, the inverted cup-shaped nut screwed on the rod and bearing upon the upper face of the bar or arm, and the plunger connected with the bar or arm, substantially as and for the purpose described.

25. In combination with the reciprocating rod, the nut thereon, the sleeve on the rod above the nut provided at each end with projecting heads or flanges, the bar or arm slotted to receive the portion of the sleeve between the heads or flanges thereon, the inverted cup-shaped nut on the rod above the sleeve and arm, and the plunger attached to the slotted arm by suitable connections, substantially as and for the purpose described.

26. In combination with the longitudinally-slotted bar or arm connected with the plunger, the reciprocating rod, the nut on the rod, the sleeve on the rod extending up through the slot in the slotted bar or arm and provided with end flanges or heads engaging the upper and lower faces of the arm, the inverted cup-shaped nut on the rod adapted to engage with its lower edge the top of the bar beyond the head on the sleeve, substantially as and for the purpose described.

27. In combination with the slotted plunger-carrying arm, the flanged sleeve on the reciprocating rod and a screw tapped through the end of such arm and swiveled to the sleeve, substantially as and for the purpose described.

28. In combination with the arm carried by the reciprocating rod having a stud extending at right angles to the face of the end of the arm, a yoke having its upper end pivoted on the stud and provided with a slot, and a set-screw extending through such slot into the end of the arm, substantially as and for the purpose described.

29. In combination with the horizontal bar or arm provided with a horizontal stud on its end, the yoke having its upper end pivoted on the stud and provided with a slot concentric with the center of motion of the yoke on the stud, and a set-screw extending through such slot into the bar end and having its head extending beyond the sides of the slot, substantially as and for the purpose described.

30. In combination with a plunger for a tobacco-press, the bar on the top thereof provided with pivot ears or lugs, the yoke having downwardly-extending lugs pivoted upon a horizontal pin or stud on a rising and falling arm or bar, and a pivot-rod passing through the ears on the bar on the plunger and the lugs on the yoke, substantially as and for the purpose described.

31. In combination with the front plate adapted to be moved bodily toward and away from the mold, means, substantially as described, adapted to draw the plate outward, away from the front of the mold and cause it to fall into an upwardly and outwardly inclined position as it is drawn outward, substantially as and for the purpose described.

32. In combination with the table and the stationary upright plate thereon forming the mold-back and provided with the horizontal flange at its back, the parallel side plates having their rear ends provided with portions extending over the top of the stationary plate and their other ends provided with lugs, screws passing through the projecting portions on the rear ends of the plates and slots in the flange on the back plate, screws passing through the lugs on the other ends of the side plates and slots in the table, and nuts on the lower ends of the screws, substantially as and for the purpose described.

33. In a tobacco-press, in combination with the two molds having movable ends and fronts, the means for alternately closing and opening the molds, a lever connected at or near opposite ends with such means, a revolving cam, and a yoke reciprocated thereby connected with one arm of the lever, substantially as and for the purpose described.

34. As a means for actuating the reciprocating blocks for closing the fronts of the two molds alternately, the pivoted lever provided with slots in its opposite arms, the screws extending through these slots up into the blocks or portions thereof, the revolving cam and the yoke reciprocated thereby connected with one arm of the lever, substantially as and for the purpose described.

35. In combination with the lever W, the reciprocating rod U', connected with the rear end of the lever, the clutch-fork on the rod, the plate on the front end of the lever having its end projecting beyond the lever side made wedge shaped, the rock-shaft, the arm on the shaft having the fork engaging such end of the plate, the arm on the shaft provided with a lug or pin, the rotary wheel provided with a notched flange engaged by the pin or lug on the arm, and a spring adapted to press the rod U' endwise, substantially as and for the purpose described.

36. In combination with the clutch-shifting lever, the wedge-shaped plate on the lever, the forked arm engaging such plate, the rock-shaft upon which the arm is carried, the arm on the shaft having a lug or pin, the wheel with the notched flange, a spring adapted to swing the arm to hold it with its pins pressed against the wheel-flange, and the handle-lever on the upper end of the rock-shaft, substantially as and for the purpose described.

37. In combination with the lever W, means for swinging its forward end outward consisting of the adjustable wedge-shaped plate on the lever, and the swinging arm $X^2$, forked to engage the sides of the wedge end of the plate, substantially as and for the purpose described.

38. In combination with the clutch on the driving-shaft, the fork for moving the reciprocating half thereof, the rod on which the fork is mounted, the spring pressing the rod so as to normally keep the sliding clutch half from the other half, the lever W, connected at its rear end with such rod, the wedge-plate on the forward arm of the lever having its wedge end projecting beyond the inner side of the lever, and the swinging arm provided with a fork engaging such wedge end of the plate, substantially as and for the purpose described.

39. In combination with the lever W, provided with the transverse guideway, the slotted plate fitting in such way formed with a wedge-shaped end projecting beyond the lever side and a lug or downward projection on the other end, a set-screw extending through the slot in the plate and into the lever, a screw connecting the lug on the plate with a lug on the under side of the lever, and a swinging arm forked to engage the wedge end of the plate on the lever, substantially as and for the purpose described.

40. In combination with the sliding half of the clutch, the clutch-fork, the reciprocating rod upon which the fork is carried sliding in suitable fixed guides, a screw-nut on the rod, a spring on the rod between the nut and one of the guides, and a screw-nut on the end of the rod beyond such guide, substantially as and for the purpose described.

In testimony that I claim the foregoing I have hereunto set my hand this 18th day of March, A. D. 1885.

CHARLES B. ADAMS.

Witnesses:
WILLIAM F. HAGEN,
GEO. A. ANDERSON.